United States Patent [19]

Sumiya et al.

[11] Patent Number: 5,070,421
[45] Date of Patent: Dec. 3, 1991

[54] MAGNETIC DISK SYSTEM HAVING TRACKING CONTROL USING RECORDED INFORMATION

[75] Inventors: Kazuhiko Sumiya; Hajime Sugino, both of Kanagawa, Japan

[73] Assignee: Fuji Xerox Co., Ltd., Tokyo, Japan

[21] Appl. No.: 698,189

[22] Filed: May 6, 1991

Related U.S. Application Data

[63] Continuation of Ser. No. 593,463, Oct. 3, 1990, abandoned, which is a continuation of Ser. No. 248,447, Sep. 23, 1988, abandoned.

[30] Foreign Application Priority Data

Sep. 25, 1987 [JP] Japan .................................. 62-23891
Sep. 25, 1987 [JP] Japan ................................. 62-238915
Oct. 7, 1987 [JP] Japan ................................. 62-251585
Feb. 3, 1988 [JP] Japan .................................... 63-21874

[51] Int. Cl.$^5$ ............................................. G11B 5/596
[52] U.S. Cl. ............................ 360/77.07; 360/77.08
[58] Field of Search ................ 360/77.07, 77.08, 77.11

[56] References Cited

U.S. PATENT DOCUMENTS

| 3,404,392 | 10/1968 | Sordello | 360/77.07 |
| 3,614,756 | 10/1971 | McIntosh et al. | 360/77.07 |
| 4,110,799 | 8/1978 | Bergmans et al. | 360/77.07 |
| 4,286,296 | 8/1981 | Cunningham | 360/77.07 |
| 4,313,140 | 1/1982 | Keidl | 360/77.07 |
| 4,318,141 | 3/1982 | Haynes | 360/77.07 |
| 4,390,911 | 6/1983 | Klaassen | 360/77.07 |
| 4,547,817 | 10/1985 | Klaassen | 360/77.07 |
| 4,581,663 | 4/1986 | Tanaka | 360/77.07 |
| 4,652,945 | 3/1987 | Marchant | 360/77.07 |

FOREIGN PATENT DOCUMENTS 0130495 1/1985 European Pat. Off. .
53-076015 7/1978 Japan .

OTHER PUBLICATIONS

IBM-Technical Disclosure Bulletin, vol. 16, No. 6, Nov. 1973, Servo Disk with Overlapping Servo and Data Tracks, Comstock et al., p. 1818.

Primary Examiner—Vincent P. Canney
Assistant Examiner—David L. Robertson
Attorney, Agent, or Firm—Finnegan, Henderson, Farabow, Garrett and Dunner

[57] ABSTRACT

A magnetic disk system comprises: a magnetic disk in which servo information is stored deeply in the appropriate fields Es longitudinally separated from the data field ED into which information of each track is stored; a subhead provided at a position ahead of the main head in a direction of data writing through the main head, the subhead being in a unitary construction with the main head and having a wider gap than the main head; a tracking control means for controlling the position of the main head relative to the desired track on the basis of the servo information SD that is read by means of the subhead for erasing information at the data field ED by means of the subhead prior to data writing by the main head in the data field ED; and a switch means for shifting the switch to tracking control means or to information erasing means.

7 Claims, 12 Drawing Sheets

MAGNETIC DISK SYSTEM HAVING TRACKING CONTROL USING RECORDED INFORMATION

This application is a continuation of application Ser. No. 07/593,463, filed Oct. 3, 1990, which is a continuation of application Ser. No. 07/248,447, filed Sept. 23, 1988 and now abandoned.

FIELD OF THE INVENTION

The present invention relates to a disk type magnetic storage and reproduction system for a floppy disk or the like, and more particularly to a disk type magnetic storage medium that stores servo information on a storage track thereof and to a magnetic disk apparatus for writing and reading information needed for tracking control on the basis of the servo information.

BACKGROUND OF THE INVENTION

With a magnetic disk apparatus, increasing track density for higher data storage density has meant that deformation of the disk due to temperature and humidity, or eccentricity of the disk center can no longer be neglected. Consequently, control for a magnetic head to cause it to follow the desired track closely must be implemented with the aid of tracking control by a servo method. In this form of control, a specific magnetic pattern (referred to as "servo information") is written on the magnetic disk in advance. Off-track error of the magnetic head on the track is detected by reading the servo information and position control of the magnetic head is performed for the head to follow the desired track on the basis of the off-track error.

In a small, fixed magnetic disk apparatus or a magnetic disk apparatus (for example, floppy disk apparatus) having an interchangeable storage medium containing a small number of magnetic disks, it is difficult to provide an exclusive servo disk and therefore a so-called data-surface servo method has been employed, in which the servo information is written on the same magnetic disk upon which the data is stored. Also, the following sector servo method has been employed with interchangeable storage media. A data track is divided into sectors S(1) to S(n) as shown in FIG. 1. Storing and reading the information is effected on a sector-by-sector basis with each sector being arranged on the storage track to have an ID field for specifying the position of that sector and a DATA field for storing data. Adjacent fields are separated by a gap G. The servo information is written in the respective sectors.

The sector servo method involves several problems with the magnetic disk. For example, the sector servo method requires provision of servo information at predetermined sectors and servo information fields on the respective tracks will have to be increased because the servo information should be read very frequently to enable the magnetic head to follow the desired track at high speed and with high accuracy. However, increasing the number of servo information fields decreases the area of the DATA field for data storage.

One way of assuring the required amount of servo information without decreasing the size of the DATA field would be to store the servo information in a deep layer of the magnetic disk. Generally, storing different magnetic patterns on the surface portion and a deep portion of the magnetic disk can be accomplished by first writing into a deep portion with a wide-gap magnetic head and then overwriting the same track field with a narrow-gap magnetic head. In addition, when reading the information by means of the magnetic head, the servo information and the data can be separated with filters from the information read by the magnetic head. The position at which the servo information is stored is not described as being important in prior art disk type magnetic storage media in which the servo information is stored in deep portions of the respective tracks as mentioned above. Nonetheless, writing servo information into the deep portion of the data field having a large area in a sector may disturb readout of the servo information through the magnetic head.

When writing new data on the data field of the respective sectors, the data is usually overwritten on the same field. Variations in the gap of the magnetic head cause different distribution functions of the magnetic field and result in variations in the thickness of magnetized portions of the servo information that is left out of the deep portion. The reproduced output level of the servo information for tracking the desired track will vary and cause unreliable readout of the servo information. Consequently, precise detection of the off-track error will not be obtained. This is particularly true with a medium-interchangeable type of apparatus (for example, floppy disk apparatus) under the situation where the data is first stored into a disk using one disk drive and later reproduced from the same disk using another disk drive. Variations of the gaps of the magnetic heads in the respective disk drives will cause variations in the precision of detecting off-track error in the respective disk drives.

Head tracking control of prior art disk storage and reproduction drives described previously has the following shortcomings. Conventionally, when performing tracking control of the head described above, the servo information is read by means of the read/write head relative to the desired track. The off-track error signal is supplied to a microprocessor after A/D conversion. The microprocessor calculates and outputs position correction data for the read/write head on the basis of the off-track error signal. The position correction signal is supplied to a head drive circuit as a control signal through a D/A conversion circuit. The head drive circuit controls the position of the read/write head on the basis of the control signal so that the read/write head follows the desired track.

The above-mentioned conventional tracking control apparatus, cannot ensure track-following with high precision for several reasons. For example, as shown in FIG. 2, if eccentricity of $\Delta d$ is caused by disk chucking error, the position of the desired track varies as depicted by the characteristic Q in FIG. 3 relative to the position if there is no eccentricity.

The phase-lag in the motion of the read/write head with respect to the change in position of the track is caused by the required process time from the reading of the servo information by the read/write head to the completion of calculating by the microprocessor and subsequent operation of an actuator. Specifically, when off-track error $\Delta X$ relative to the desired track is caused at time $t_0$ in FIG. 3, signal processing is performed to correct the off-position error. When the off-track error $\Delta X$ is corrected after a certain process time, the variation from the desired track will have changed. Thus, if the desired track varies with characteristic Q in FIG. 3, then the read/write head will follow with characteristic Q' in FIG. 3, causing the track-following capability to be degraded by the phase lag.

In the case where the necessary information is written at the same time as the aforementioned tracking control is performed, identification information written in an ID field of the respective sector is read by means of the read/write head. When the sector is determined on the basis of the ID information to be the sector into which data is to be written, the necessary information is written into the DATA field of that sector. The data is written through an overwrite operation in which even though the DATA field has already been written, additional data is written over the previous data. This is a further shortcoming of conventional disk devices.

A conventional magnetic disk apparatus as thus far described not only has a limitation in implementing high storage density on a magnetic disk, but cannot ensure a stable condition for writing information. This problem is compounded because in data writing operations a magnetic head with a narrow gap is used to improve reproduction resolution in high density storage and the data that has been written previously may not be erased completely because the storage magnetic field does not reach deeply into the disk when writing data with the narrow gap magnetic head. Thus, a stable data writing operation cannot be assured.

SUMMARY OF THE INVENTION

An object of the present invention is to provide a disk drive system wherein servo information is written in a deep portion of the disk which is not affected by writing necessary data even if the gap length of the magnetic head varies from head to head.

Another object of the present invention is a disk drive system having magnetic storage medium in which servo information for tracking-control is written in a deep portion of a field longitudinally separated from a data field.

A further object of the present invention is a disk drive system that compensates for lag in track-following relative to the desired track due to process time.

Still another object of the present invention is a disk drive system that enables position control of the magnetic head relative to the desired such track in a manner that the field into which the necessary data is to be written is not affected and data writing can be performed after previous data has been erased.

BRIEF DESCRIPTION OF THE DRAWINGS

The manner by which the above objects and other objects, features, and advantages of the present invention are attained will be apparent from the following detailed description when considered in view of the drawings, wherein.

DETAILED DESCRIPTION

A first embodiment of the invention will be described in detail with reference to FIGS. 4 to 7.

Figure 4:
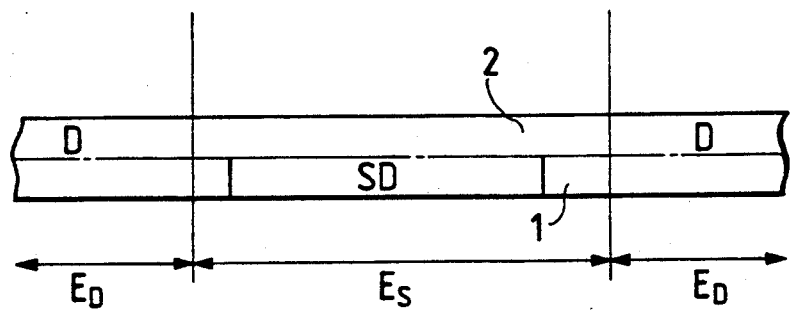
FIG. 4 is a cross-sectional diagram of a disk showing how information is stored in a magnetic disk system according to the present invention.

The first embodiment of the invention is directed to a disk type magnetic storage medium in which servo information SD for tracking-control is written in the respective tracks. The shortcomings described are overcome as shown in FIG. 4 wherein a field into which the servo information SD is to be written is provided deeply in a field ES longitudinally separated from a data field ED in which the information D is written in the respective storage track.

In field ES are located ID information in a surface portion 2 and servo information SD in a deeper portion 1. A magnetic head subject to tracking-control or a magnetic head for reading only servo information reads the servo information SD written in the deep portion. The servo information is sampled from the information that has been read from the field ES and position control of the magnetic read/write head relative to the desired track is performed on the basis of this servo information SD. With the read/write head following the desired track under position-control relative to the desired track, writing information D into and reading information D from the data field ED is performed by means of the magnetic head. In the field ES in which the servo information SD has been written in the deeper portion 1, only reading the servo information SD or the ID information is performed and the writing of information is not permitted.

Figure 5:
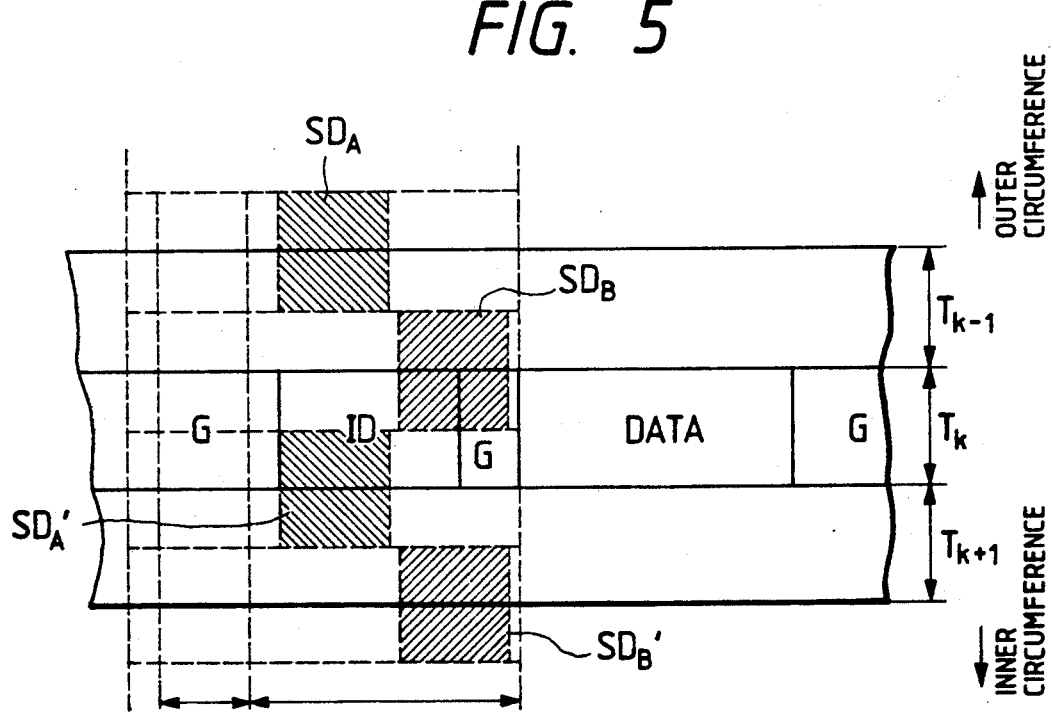
FIG. 5 is a diagram showing how information is stored in a magnetic disk in the system of the present invention.

The first embodiment of the present invention will be described in more detail as follows. FIG. 5 is a diagram showing the information stored in the magnetic disk. In FIG. 5, respective tracks Tk−1, Tk, Tk+1, . . . which are formed concentrically on the magnetic disk, are divided into sectors. Each sector includes a gap G in accordance with the process time, an ID field in which the identity information is stored, and a DATA field in which the necessary information is written and read. The identity information ID and the read/write information are located on the surface portion of the magnetic disk, and in a deep portion are formed the servo tracks of portions offset by ½ track.

Figure 6:
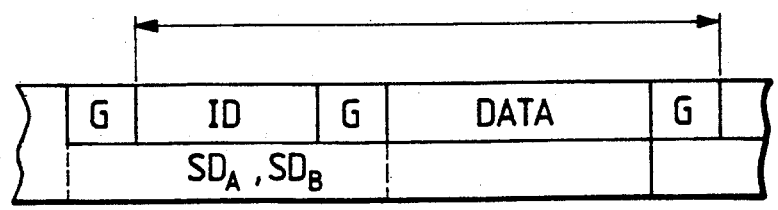
FIG. 6 is a diagram showing an example of how information is stored depthwise in the magnetic disk at respective sectors.

The gap G and the servo track located in the deep portion of the ID field as shown in FIG. 6 are split into, for example, a position information portion and a synchronism portion. In the position information portion are written four types of servo information $SD_A$, $SD_B$, or $SD_A'$, $SD_B'$, alternately.

The servo information $SD_A$, $SD_B$ or $SD_A'$, $SD_B'$ can be written into a deep portion of about 1 to 3 um deep by writing with a servo write head having a gap width of about 1 to 2 um. The servo information is written with low storage density as compared to conventional data tracks. At this time, it is desirable for the ID field to be written at the same time as the servo write with a magnetic head having a narrow gap that regulates the storage depth thereof.

Figure 7:
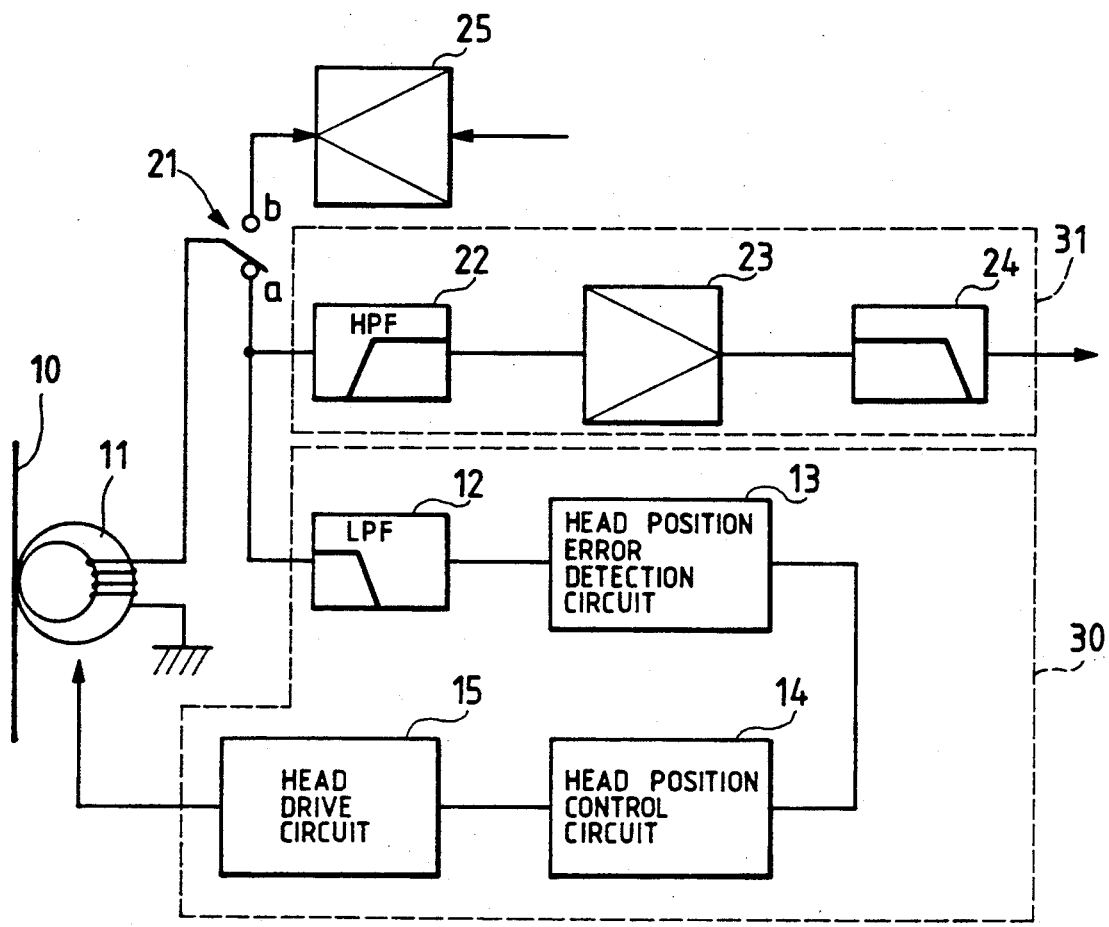
FIG. 7 is a block diagram showing a basic arrangement of a magnetic head tracking control apparatus for a disk system according to the present invention.
Figure 8:
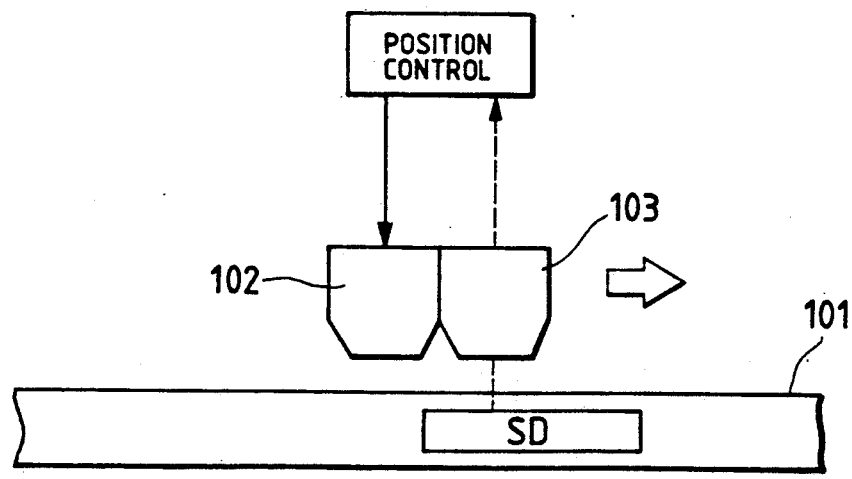
FIG. 8 is a diagram showing a second embodiment of the disk system of the present invention.

FIG. 7 is a block diagram showing a basic example of tracking control apparatus of the present invention for a magnetic head. FIG. 7 also comprises a conventional storage and reproduction system. In FIG. 7, the reference numeral 10 is a magnetic disk of an arrangement as shown in FIG. 5 and FIG. 6 and the reference numeral 11 is a magnetic head for reading from and writing into the disk 10.

A low pass filter (LPF) samples low frequency components from the signal read by the magnetic head 11. A head position error detection circuit 13 detects an off-track amount of the magnetic head 11 relative to the desired track Tk on the basis of the servo information $SD_A$, $SD_B$ or $SD_A'$, $SD_B'$. The head position error detection circuit 13 is adapted to sample and hold, for example, the servo information $SD_A$ or $SD_A'$ on the inside of the circumferential track Tk and the servo information $SD_B$, $SD_B'$ on the outside of the circumferential track Tk and then to output a position error signal (corresponding to an off-track amount on the inside or on the outside of the track Tk) on the basis of the level of the sampled information. A head position control circuit 14 outputs a position correction signal to correct the positional error relative to the desired track Tk of the magnetic head 11 which corresponds to the position error signal from the head position error detection circuit 13. A head drive circuit 15 drives the magnetic head on the basis of the position correction signal from the head position control circuit 14.

A tracking system 30 comprises the aforementioned low pass filter 12, the head position error detection circuit 13, the head position control circuit 14, and the head drive circuit 15.

A switch 21 selects a data read operation or a data write operation. A parallel circuit of the tracking system 30 and a read system 31 are coupled to circuit a of the switch 21. The read chain extends to a data separator through a high pas filter 22, amplifier 23, and a high pass filter 24. A write chain follows circuit b of the switch 21 through an amplifier 25.

The operation of the first embodiment will now be described as follows.

After the magnetic head 11 has moved to the desired track Tk upon a seek instruction, the magnetic head 11 reads the ID field for finding the sector of interest in read/write mode. At this time, the signal read by means of the magnetic head 11 contains two superimposed signals, a low density signal corresponding to the servo information $SD_A$, $SD_B$ or $SD_A'$, $SD_B'$ and a high density signal corresponding to the sector identity information ID. The superimposed signals are fed to the high pass filter 22 to supply the read chain with only the sector identity information while the same superimposed signals are fed to the low pass filter 12 to supply the head position error detection circuit 13 with only the servo information SDA, SDB or SDa', SDB.' The head position error detection circuit 13 outputs the position error signal in accordance with the off-track amount of the magnetic head 11 relative to the desired track Tk and the head position control circuit 14 controls the head drive circuit 15 on the basis of the position error signal to cause the magnetic head 11 to follow the desired track Tk. With this condition, when the desired sector identity information is recognized in the read chain, a signal is read by means of the magnetic head 11 from the DATA field that is specified by the desired sector identity information and is then processed as the information if the operation is in the read mode.

If the operation is in the write mode, the switch 21 shifts to the circuit b to receive the signal to be written from the amplifier 25 so that it can be written in the DATA field of the same sector by means of the magnetic head 11.

As described above, according to the present invention, the servo information is written in the deep portion of the gap G, and the ID field at the predetermined sector. Thus, the servo information is not affected by writing information into the DATA field of the sector through the magnetic head 11. For example, consider a floppy disk apparatus having an interchangeable storage medium. Even if the gap of the magnetic head varies from disk drive to disk drive, the servo information that is read will not vary.

The position into which the servo information is to be written is not limited to the deep portion of the gap G and the ID field within the sector as in the embodiment described above, but can be set arbitrarily in accordance with the format of the magnetic disk as long as it is a field longitudinally separated from the DATA field into which information is written by means of the magnetic head 11.

Also, the servo information is not limited to a burst pattern as described above. For example, a dual-phase bit pattern can be selected to enable seek operations to be performed with higher speed and accuracy.

According to the first embodiment of the present invention, since the servo information is written in the deep portion of the field where the data information is not also written, the servo information will not be affected by writing the necessary data even if the gap of the magnetic head varies from head to head. Thus, reading the servo information through the magnetic head can be accomplished accurately to implement tracking control of the magnetic head with high precision and with improved precision in position error detection.

A second embodiment of the invention will now be described with reference to FIG. 8 to FIG. 13. This embodiment is also directed to a tracking control apparatus of a head in which necessary information is stored in respective concentric information storage tracks formed on a disk-shaped storage medium, and the servo information SD is stored in a predetermined field of the tracks. The position of the head relative to the desired track is controlled on the basis of the servo information SD read off of the disk by the read head. The shortcoming of conventional devices as described above is overcome by constructing a head assembly including a head 103 for reading only servo information which is provided in the same assembly as a data read head 102 such that the head 103 reads the servo information on which control is based before the head 102 under control reads the servo data information.

The servo head 103 reads the servo information SD before the head 102 to be position-controlled reads the servo information, and the position of the head 102 is controlled on the basis of the servo information SD. In this case, time elapses before the head 102 reaches the position for reading the servo information. During that time, the processing for position control of the head 102 and the lag in track-following due to the process time is effectively eliminated.

Figure 9:
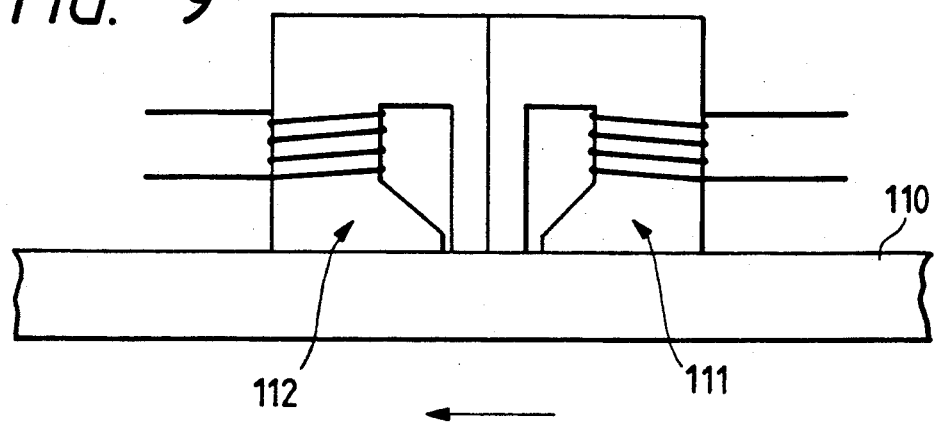
FIG. 9 is a diagram showing a basic arrangement of a head applied to a tracking control apparatus according to the second embodiment of the present invention.

FIG. 9 shows diagrammatically a construction of a head assembly of a magnetic disk apparatus using a tracking control apparatus according to the second embodiment of the invention. In FIG. 9, a head 111 is used only for reading the servo information that has been written in the magnetic disk 110. A read/write head 112 reads and writes the DATA information. The servo head 111 and the read/write head 112 are constructed as a single head assembly or unit. Also, the magnetic head 111 is positioned upstream in the running direction of the magnetic disk with respect to the head 112. In other words, the servo head 111 is positioned ahead of the read/write head 112.

Figure 10:
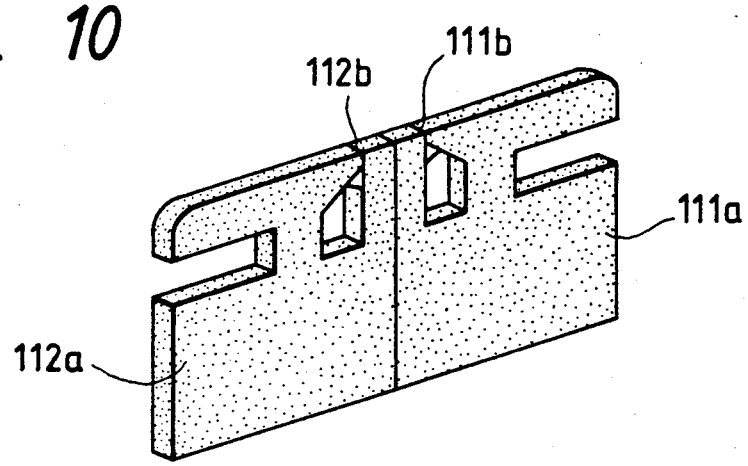
FIG. 10 and FIG. 11 are diagrams showing specific examples of the construction of a head applied to the tracking apparatus according to the present invention.
Figure 11:
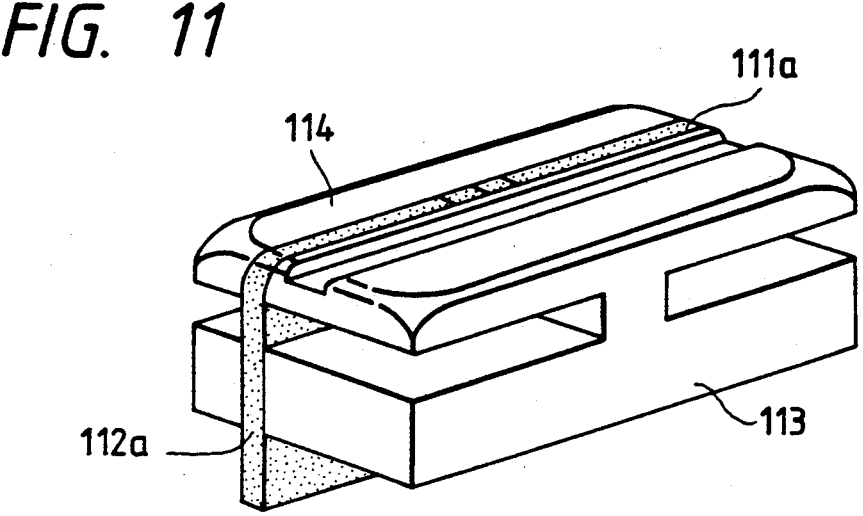

The specific construction of the aforementioned servo head 111 and the read/write head 112 are shown in FIG. 10 and FIG. 11.

In FIG. 10, a core 111a of the servo head is formed of Mn-Zn ferrite and a core 112a of the read/write head is formed of a similar material. Each core 111a, 112a is provided with a gap 111b, 112b of a predetermined dimension. The shape of the respective cores are selected so that the distance between the gaps 111b and 112b is 500 um approximately. The two cores are bonded together with adhesive.

An exciting coil (not shown) is wound around the respective cores 111a, 112a, which are bonded together and supported, as shown in FIG. 11 by fixed mounting members 113, 114 formed of calcium titanate. The servo and read/write heads constructed as a unit by the supporting members 113, 114 are disposed with respect to the magnetic disk as shown in FIG. 9 and the magnetic disk is arranged in the same manner as shown in FIG. 4 and FIG. 5.

Figure 12:
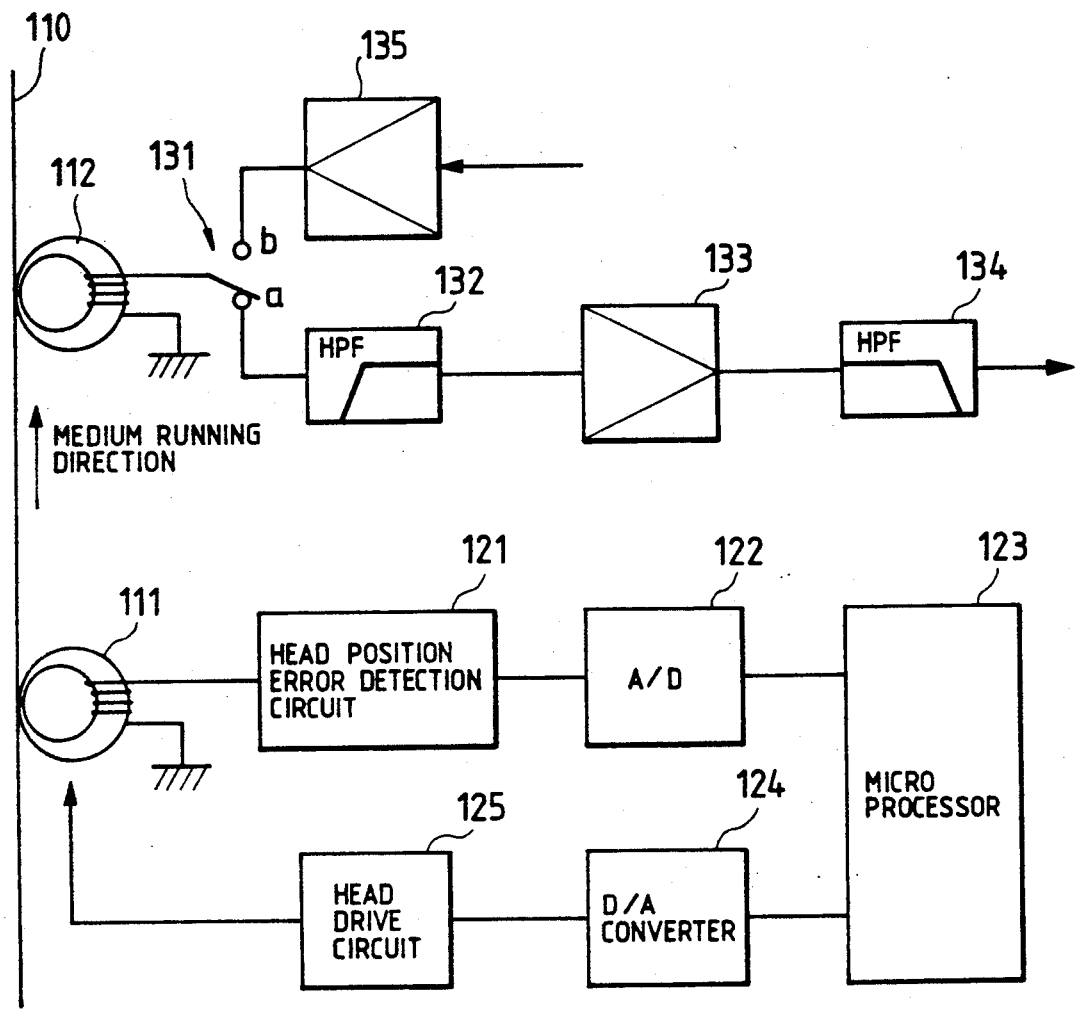
FIG. 12 is a block diagram showing a basic arrangement of the tracking control apparatus according to the second embodiment of the present invention.

FIG. 12 shows a basic arrangement of the tracking control apparatus of a magnetic head according to the second embodiment of the present invention. In FIG. 12, the servo head 111 and the read/write head 112 are constructed as a unit as shown in FIG. 9 and FIG. 11, and the servo head 111 is positioned ahead of the read/write head 112 with respect to the magnetic disk 110. The gap of the servo head 111 is formed to be wide as described previously because the servo information has been written into the deep portion of the disk, and the servo head must be prevented from recording information into the surface position of the disk. In addition, the gap of the read/write head 112 is regulated to be relatively narrow as in conventional read/write heads. This read/write head 112 is the same as the head used in the first embodiment. A head position error detection circuit 121 detects the amount of head-to-track misregistration of the servo head 111 relative to the desired track Tk through the servo head 111 on the basis of the reproduced servo information $SD_A$, $SD_B$ or $SD_A'$, $SD_B'$. The head position error detection circuit 121 receives inputs sequentially. For example, the servo information $SD_A$ or $SD_A'$ on the inner side of the circumferential track Tk and the servo information $SD_B$, or $SD_B'$ on the outer side of the circumferential track Tk are sampled and held to output the position error signal corresponding to the off-track amount on the inner side or outer side relative to the track Tk. An A/D converter circuit 122 and a microprocessor 123 are also provided. The position error signal from the head position error detection circuit 121 is inputted as predetermined bit information into the microprocessor 123 through the A/D converter circuit 122. The microprocessor 123 performs overall control of the tracking control system and calculates position modifying data indicative of the off-track error of the servo head 111 relative to the desired track Tk in order to modify the off-track error.

A D/A converter circuit 124 is connected to a head drive circuit 125 for driving the read/write head 112 and the servo head 111. The position error modifying data (analog signal) from the microprocessor 123 is converted into an appropriate position modifying signal (analog signal) by the D/A converter 124. The head drive circuit 125 is arranged to drive the aforementioned heads in a unit construction on the basis of the position modifying signal from the D/A converter 124.

As shown in FIG. 12, a switch 131 may select the circuit a comprising a high pass filter 132, an amplifier 133, and a high pass filter 134 or a circuit b comprising an amplifier 135 that receives the signal to be written on the disk by the head 112.

The tracking control apparatus of a magnetic head operation is implemented by the second embodiment of the present invention as follows. When the servo information $SD_A$, $SD_B$ or $SD_A'$, $SD_B'$ read from the deep portion of the disk through the servo head 111 after the head assembly including the servo head 111 and the read/write head 112 has been moved to the desired track Tk upon a seek command, the head position error detection circuit 121 outputs the position error signal relative to the desired track Tk on the basis of the servo information. The head drive circuit 125 drives the unit assembly of the heads to follow the desired track Tk.

Figure 3:
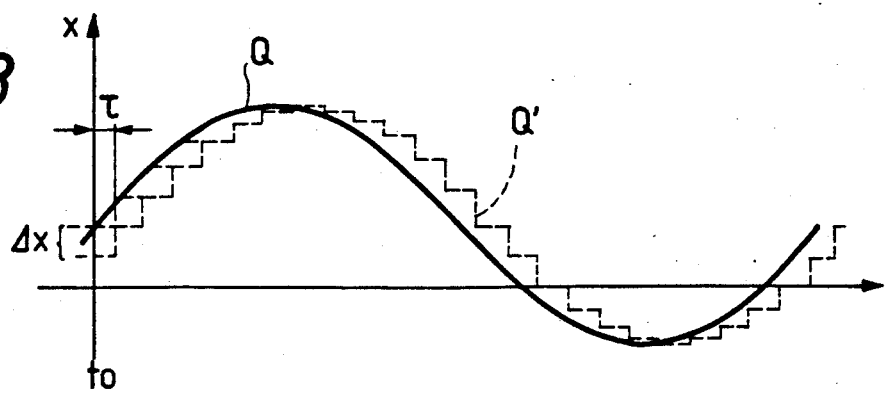
FIG. 3 is a diagram showing characteristics of track-following performance of a head relative to a desired track under conventional tracking control.
Figure 13:
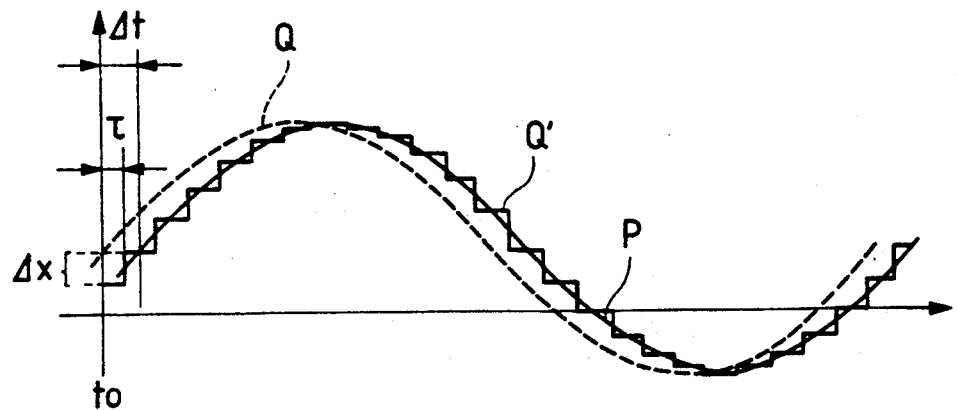
FIG. 13 is a diagram showing how the position of the head is controlled relative to the desired track.

It should be noted that, as shown in FIG. 13, the head driving operation is effected at a lapse of processing time to modify the off-track amount $\Delta X$ (detected at time $t_0$) relative to a position Q of the desired track Tk and therefore has track-following-performance relative to the desired track Tk as depicted by Q' to cause phase lag similar to the conventional apparatus to FIG. 3. However, it should also be noted that the read/write head 112 lags behind the servo head 111 to reach the similar disk position rotational angular position after Δt. That is to say, the fact that the servo head 111 and the read/write head 112 are driven simultaneously as a unit implies, if it is seen from the disk side, that that read/write head 112 is control-driven prior to the servo head. Thus, the fact that the unit construction of the read/write head 112 and the servo head 111 is controlled with a characteristic Q' implies that the read/write head 112 is driven with a characteristic Q' relative to the characteristic Q that is effectively exhibited by the desired track Tk+Δt after movement to the desired track has occurred. The following is the specific relation between the processing time τ for controlling the read/write head and the lag time Δt of the read/write head 112 relative to the servo head 111. For example, assuming that the distance between the servo head 111 and the read/write head 112 is 500 um (distance between the gaps of the heads) and the tangential velocity of the desired track Tk is 1.5 m/sec, $$\Delta t = 500 \text{ um}/1.5 \text{ m/sec}$$
$$= 330 \text{ usec}$$

while the processing time is approximately 100 usec if a conventional microprocessor is assumed. Thus, when the read/write head that is to be controlled arrives at a position where the servo information is actually read (corresponds to 330 usec), the control processing with respect to that position will have already been completed.

In the manner described, identity information is read to seek the desired sector while the position control of the read/write head 112 relative to the desired track Tk is being carried out. At this time, the signal through the read/write head 112 comprises two superimposed signals. One reproduced signal corresponds to the servo information $SD_A$, $Sd_B$ or $SD_A'$, $SD_B'$ of low density, and the other signal corresponds to the identity information ID of high density. With this condition, the superimposed signals are fed to the high pass filter 132 that supplies only the identity information ID to the read chain. When the desired identity information is recognized in the read chain, the signal is read and processed for reproduction from the DATA field specified by the identity information through the read/write head 112 if a read operation is specified. If a write operation is to be performed, then the switch 121 is shifted to the circuit b to write the information supplied from the amplifier 135 as DATA in that sector by means of the read/write head 112.

As stated above, according to the present invention, the position of the read/write head 112 relative t the desired track is controlled on the basis of the servo information that is read by the servo head 111 as the disk moves in the direction of the read/write head 112. Therefore, while a certain amount of processing time t is required for position control processing, the read/write head 112 can be controlled more precisely with the characteristic Q' to follow the position variation characteristic Q of the desired track. Writing the servo information into the deep portion of the disk, as described above, permits accurate tracking control without sacrificing the amount of information to be written. Particularly, combining this second embodiment with the first embodiment in which the servo information is written into the deep portion of the ID field where no information is written, prevents variations in the thickness of the magnetic portion of the servo information written in the deep portion due to heads having variations of the gap length, and permits precise readout of the servo information.

According to the second embodiment, the gap of the servo head 111 is set to be wide, particularly in accordance with the write position (deep portion), but otherwise the apparatus can also be arranged to separate the servo information of low density with the low pass filter as in the first embodiment. Also, in this case the apparatus can be arranged to sample the servo information from the signal through the servo head, while also sampling the identity information ID of high density by means of the high pass filter.

Additionally, the second embodiment may, of course, be applied to the case where the position of the servo information is not in the deep portion of the disk but is written as identity information in the conventional field within the sector.

As stated above, according to the present invention, the position of the head to be positioned-controlled relative to the desired track is controlled on the basis of the servo information that is read out by means of the servo head running ahead of the read/write head to be positioned-controlled. Therefore, a certain amount of processing time is required for the head to be positioned-controlled to arrive at the position at which the servo information is written, and it becomes possible to compensate for the lag time in track-following due to the processing time required for position control. As a result, the track-following precision of the head to be positioned-controlled is improved.

A third embodiment will now be described in detail with reference to FIG. 14 to FIG. 18.

Figure 14:
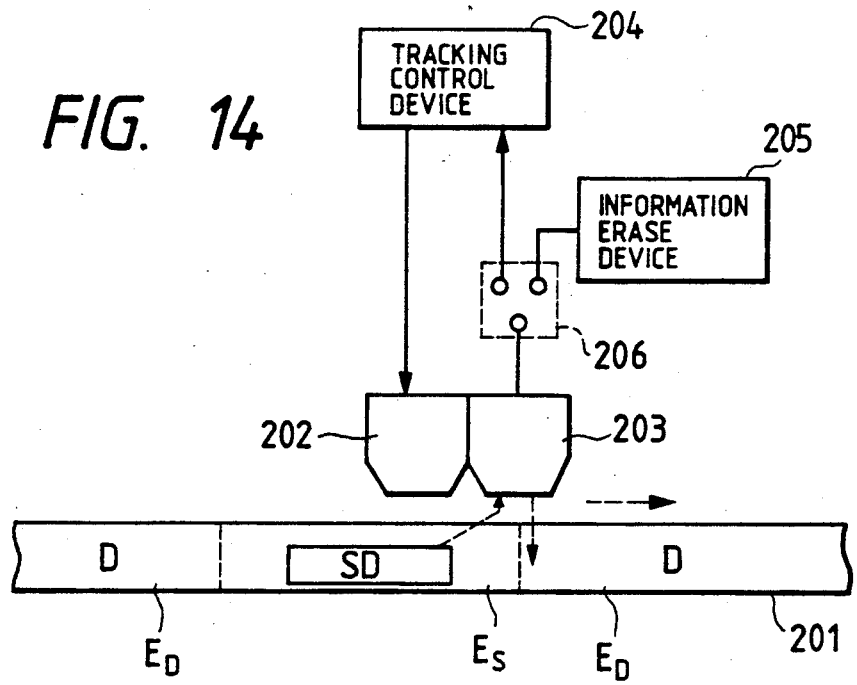
FIG. 14 is a diagram showing a third embodiment magnetic disk system of the present invention.

As shown in FIG. 14, a magnetic disk 201 has servo information SD stored in a deep portion of a predetermined field ES, which is longitudinally separated from the data field $E_D$ where DATA information of each track is written. A head assembly includes a subhead 203 constructed as a unit with a main head 202 for writing information at a position ahead of the main head 202. The subhead 203 has a gap wider than that of the main head 202, and a tracking control device 204 controls the position of the main head 202 relative to the desired track on the basis of the servo information that is read out by means of the subhead 203 from the field $E_S$. An information erase device 205 is provided for erasing the information in the field $E_D$ by means of the subhead 203 prior to data write into the data field $E_D$ through the main head 202. A switch 206 selectively connects the subhead 203 to either tracking control device 204 or the information erasing device 205.

When the subhead 203 takes up a position coinciding with the field $E_S$ on the disk 201, the connection of the subhead 203 is shifted to the tracking control device 204 by means of the switch 206. The tracking control device. 204 controls the position of the main head 202 relative to the desired track on the basis of the servo information SD that is read out from the deep portion of the disk 201. While the main head 202 follows the desired track under tracking control described above, the subhead 203 takes up a position coinciding with the field $E_D$. The connection of the subhead 203 is shifted to the information erasing device 205 by means of the switch 206, to erase information in the data field $E_D$ by means of the subhead 203 prior to writing the information through the main head 202. New information may then be written by the main head 202.

Figure 1:
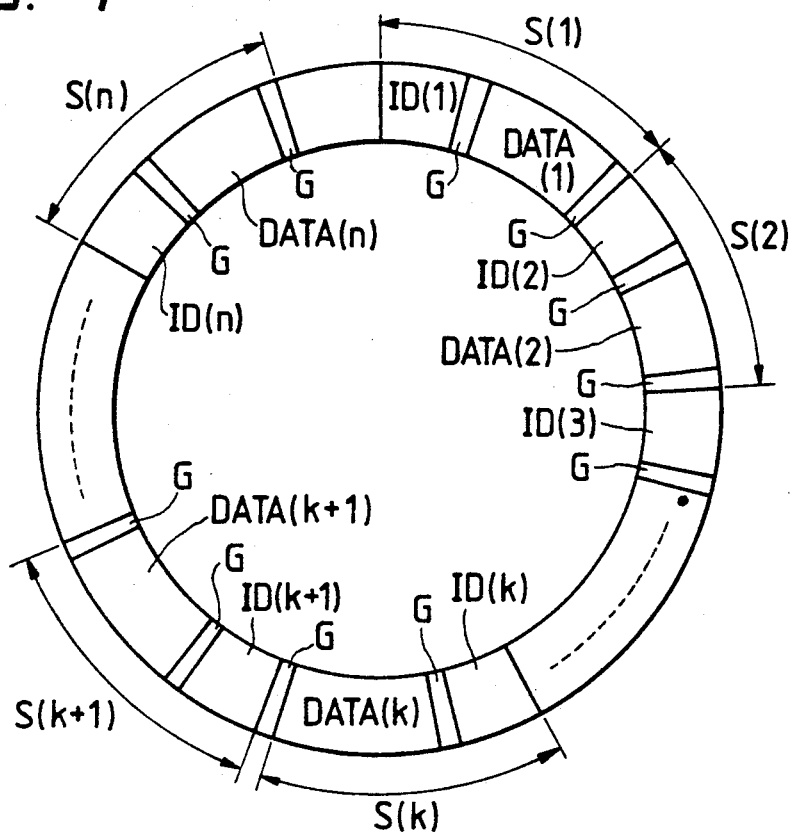
FIG. 1 is a diagram showing an example of a conventional data format for recording data on a disk.
Figure 2:
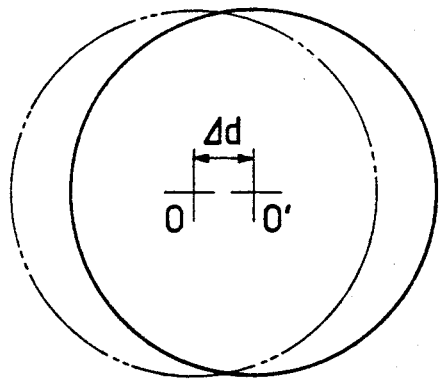
FIG. 2 is a diagram showing a magnetic disk having eccentricity.
Figure 15A:
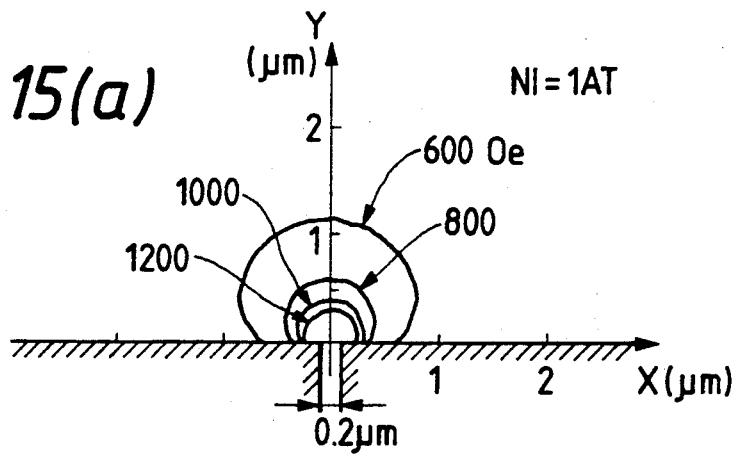
FIG. 15 is a diagram showing the relationship between the head gap and the stored magnetic field.
Figure 15B:
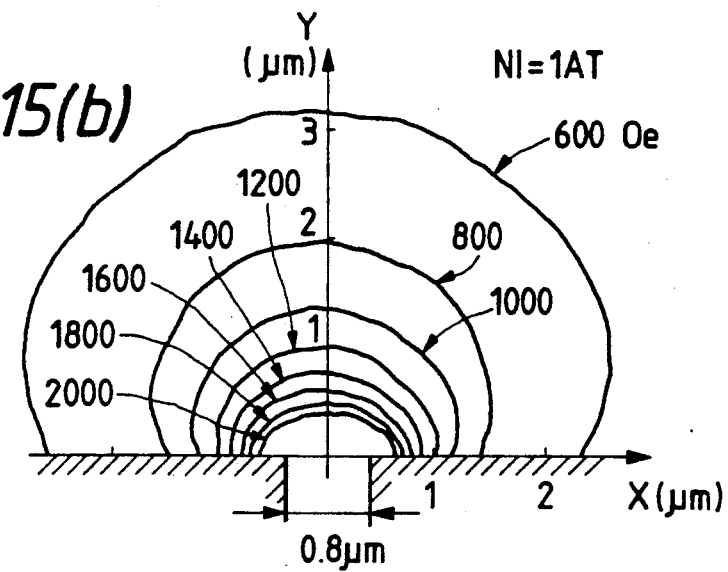

When a new data is to be written into the disk shown in FIG. 1, the new data is usually written over the old data in the field. More specifically, the position information of the ID field is read by means of the read/write head to seek the desired sector and then a clock count is started from the last sector of the ID field and the desired sector is recognized on the basis of the position data that is read out. After a predetermined time, a write gate it turned ON so that the new data starting with a synchronous pattern is stored in the data field by means of the read/write head. It has been proposed that the gap length of the read/write head be made small to increase storage density in the running direction of the magnetic disk or so called line storage density for the purpose of increasing the storage capacity of the magnetic disk as a storage medium. However, the shorter the gap length of the read/write head, the shallower the penetration of the magnetic field to be stored into the storage medium. For example, FIGS. 15(a) and 15(b) show the value of storage magnetic field distribution calculated by a finite element method for the gap lengths of 0.2 um (FIG. 15(a)) and (FIG. 15(b)) 0.8 um when a Mn-Zn ferrite head is used. The storage magnetic field of 1000 (Oe) penetrates as deeply as approximately 1.5 um from the surface of the head with the magnetic head having the gap length of 0.8 um while it penetrates only about 0.3 um with a magnetic head having the gap length of 0.2 um. Recently, BA-ferrite magnetic powder has been proposed for use in making a flexible disk medium. It is difficult to make a coated medium having a magnetic coating with a thickness of less than 0.3 um. Also, the magnetic coating should not be made too thick. A disk having a magnetic coating thickness of about 1 um and using a narrow-gap head having the gap length of about 0.2 um cannot magnetize with the necessary storage magnetic field (more than 1000 Oe) over the entire magnetic coating but only magnetize the surface portion of the magnetic coating.

Stable write conditions cannot be obtained easily with the aforementioned magnetic disk apparatus. This is due to several reasons. For example, writing the new data into the data field DATA(i) of each sector S(i) of the magnetic disk is effected by overwrite. Data is often read through data that has been previously written and subsequently written over. If the disk is of a type in which only the surface portion is magnetized (which is common in a flexible disk apparatus in which the magnetic disk is intended to be interchanged among different disk devices) even though the new data is written through an overwrite operation, the old data that has been left in the deep portion of the disk may not be erased due to variations in the gap length of the head. To overcome the shortcomings described above, the erase head may be positioned ahead of the read/write head to erase the old data in the data field DATA(i) prior to performing a write operation of the new data through the read/write head. This permits information to be written without degradation caused by overwrite characteristics.

The third embodiment will now be described in detail with reference to the drawings. The head portion of the magnetic disk apparatus according to the third embodiment is similar to that of the second embodiment, i.e., the apparatus shown in FIG. 9 to FIG. 11. In this third embodiment as shown in FIG. 18, the gap 111$b$ of the subhead 111 is made wider than the gap 112$b$ of the read/write head 112 (for example, the gap 111$b$ is 2 um and the gap 112$b$ is 0.35 um). The same magnetic disk as in the first embodiment, shown in FIGS. 4 and 5, is used in the third embodiment.

Figure 16:
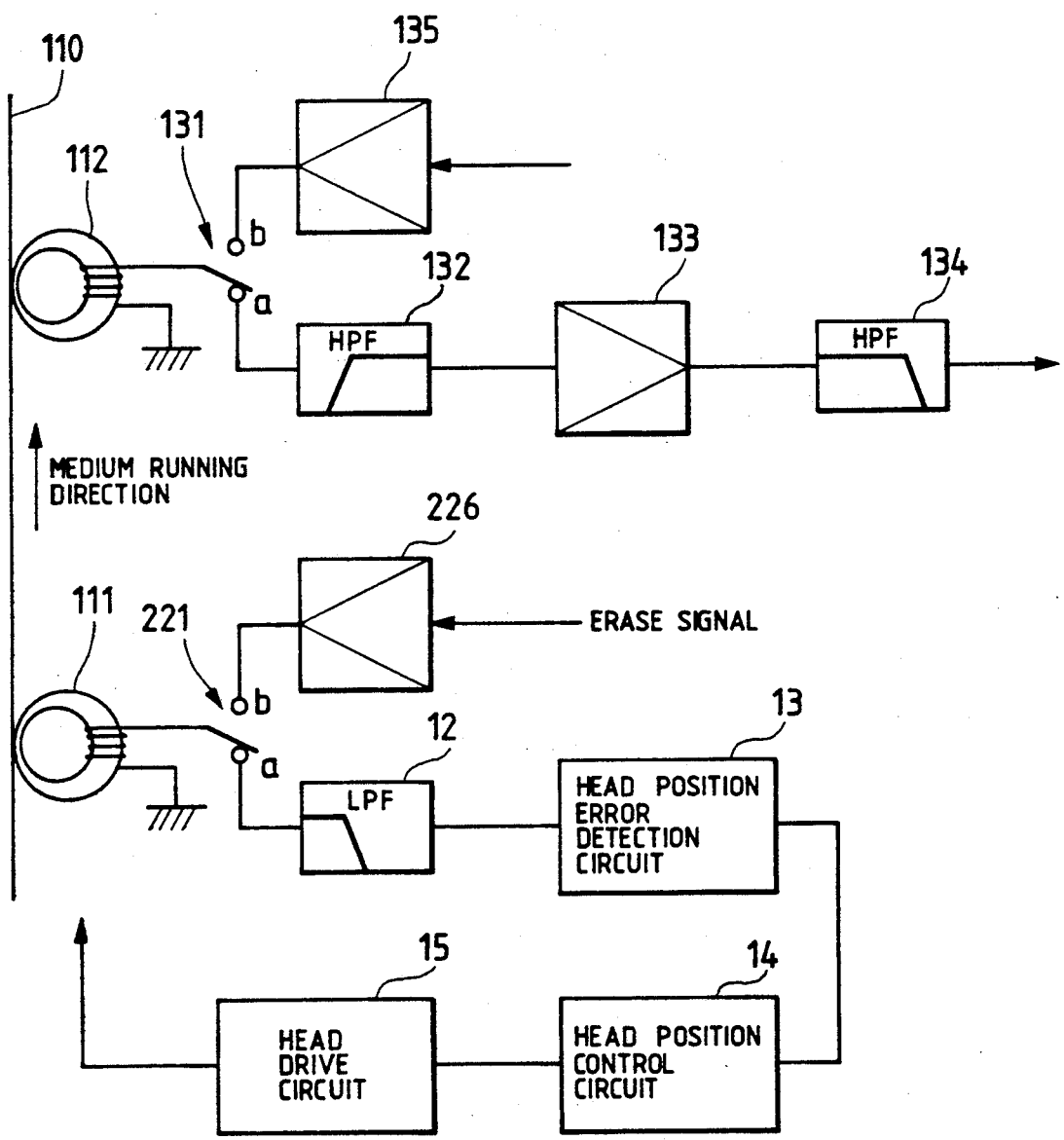
FIG. 16 is a block diagram showing a basic arrangement of a magnetic disk system according to the third embodiment of the present invention.

FIG. 16 is a block diagram for showing a basic arrangement of a magnetic disk apparatus according to the third embodiment, and is generally identical with the basic arrangement shown in FIGS. 7 and 12, except that the subhead 111 is supplied with an erase signal in the third embodiment. In FIG. 16, elements given the same reference numerals as in FIGS. 7 and 12 are the elements that perform the same functions as similarly-numbered elements in FIGS. 7 and 12. As apparent from FIG. 12 and FIG. 16, the storage and reproduction chain (112, 131, 135, 132, 133, 134) preceded by the main head 112 are the same in both embodiments. On the other hand, the subhead 111 according to the third embodiment includes a switch 221 and a subsequent erase chain (226) and a tracking chain (12, 13, 14, 15), which is somewhat different from the tracking chain (121, 122, 123, 124, 125) of the second embodiment but is substantially the same as that of the first embodiment in FIG. 7.

The basis arrangement in FIG. 16 will now be described in more detail. A switch 221 selects between the tracking control function and the information erase function. In the tracking control chain, a low pass filter 12 samples low frequency components of the signal read by the subhead 111, and a head position error detection circuit 13 detects the head-to-track misregistration of the subhead 111 relative to the desired track Tk on the basis of the aforementioned servo information $SD_A$, $SD_B$, or $SD_A'$, $SD_B'$. The head position error detection circuit 13 is adapted to sample and hold the servo information $SD_A$ or $SD_A'$ on the inner circumference of the track Tk and the servo information $SD_B$ or $SD_B'$ on the outer circumference of the track Tk to output a position error signal (corresponding to an off-track amount of the head on the inner circumference or outer circumference relative to the track Tk) on the basis of the levels of the servo information. A head position control circuit 14 outputs a position modification control signal to cause movement of the subhead to compensate for the off-track amount relative to the desired track Tk. The position modification control signal corresponds to the position error signal from the head position error detection circuit 13. A head drive circuit 15 drives the subhead 111 and the main head 112, which are constructed as a unit construction in the head assembly, on the basis of the position modification control signal from the head position control circuit 14.

In the erase chain, an erase signal is supplied from the overall control system (not shown) of the magnetic disk apparatus to the subhead 111 through the amplifier 226. The read/write chain (131, 135, 132, 133, 134) is substantially identical to that of the second embodiment.

After the head assembly including the subhead 111 and the main head 112 has been moved to the desired track upon the seek command, the switch 221 connects the subhead 111 to low pass filter 12 and the tracking control is performed with respect to the desired track Tk. The signal through the subhead 111 is allowed to pass through the low pass filter 12 to sample the servo information $SD_A$, $SD_B$, or $SD_A'$, $SD_B'$ of low density and the sampled signal is fed to the head position error detection circuit 13. The head position error detection circuit 13 outputs the position error signal with respect to the desired track Tk on the basis of the servo information. The head drive circuit 15 controls the head assembly including the heads 111, 112 assembled as a unit to follow the desired track on the basis of the position modification control signal from the head position control circuit 14 corresponding to the position error signal. In this manner, the position of the main head 112 is controlled.

Figure 17:
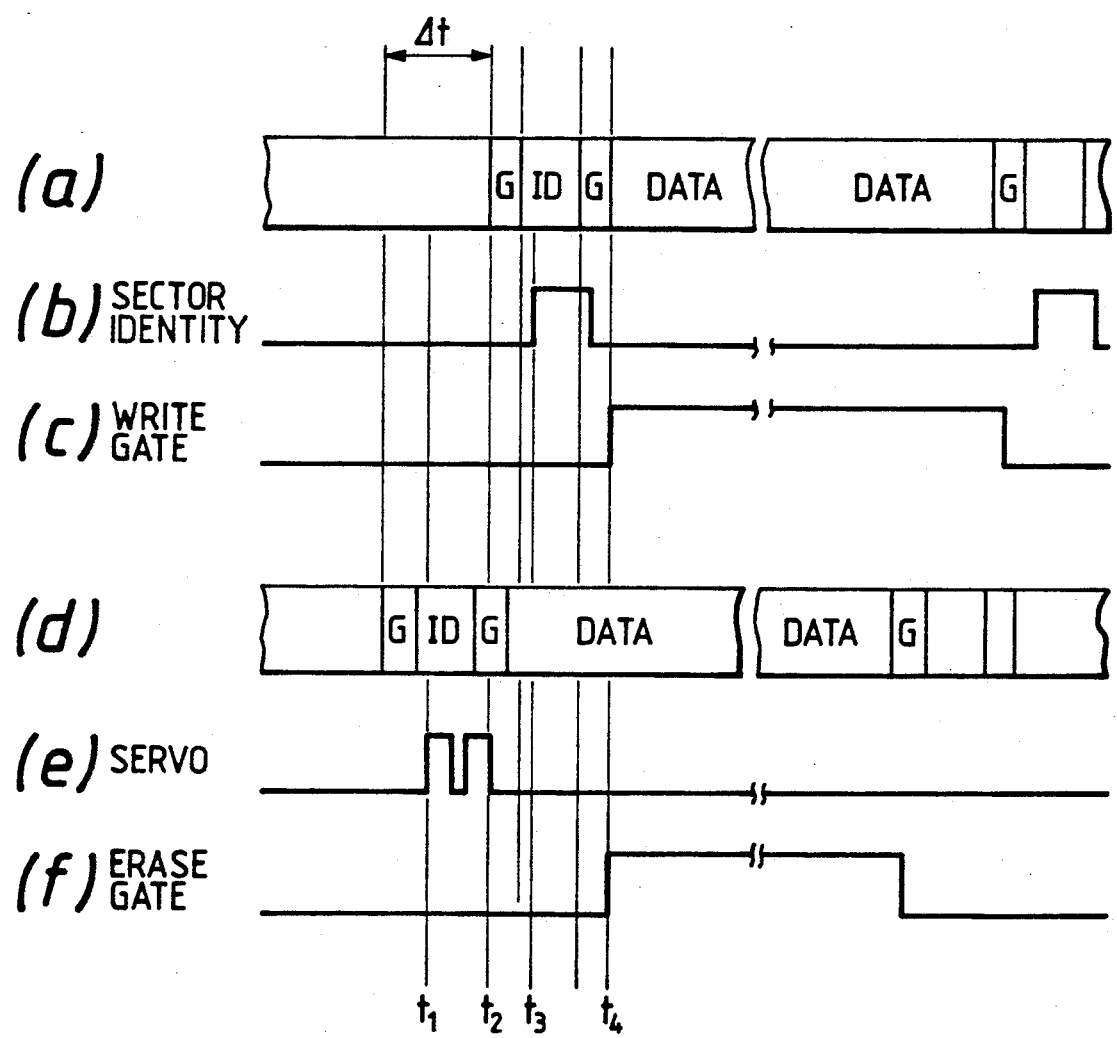
FIG. 17 is a timing chart showing access timing of a subhead and a main head.

The timing of these operations is shown in FIG. 17, in which part (a) shows the positional relation of the main head relative to the track, and similarly part (d) shows the positional relation of the subhead 111 relative to the same track. In other words, the main head and the subhead are spaced apart from each other by Δt in terms of the running time of the track.

The servo sync signal appears between time t1 and t2 to read the servo information $SD_A$, $SD_B$ or $SD_A'$ $SD_B'$ by means of the subhead 111 as shown in part (e), thereby effecting the aforementioned tracking control. The sector identity information is then read when the main head 112 reaches the ID field to cause a VFO (variable frequency oscillator) clock, used for data reading, to appear at the time t3 as shown in part (b). At this time, the signal through the main head 112 consists of two superimposed signals, a low density signal corresponding to servo information $SD_A$, $SD_B$ or $SD_A'$, $SD_B'$ and a high density signal corresponding to sector identity information. This superimposed reproduced signal is filtered by the high pass filter 132 to supply the read chain having only the identity information of high density. The reproduced signal is read through the main head 112 from the DATA field of the sector specified by the identification information and is processed in the read operation. On the other hand, in a write operation, the switches 221 and 131 are both shifted to position b to cause a write gate signal part (c) and an erase gate signal part (f) to appear at time t4, which is a predetermined timing after the recognition of the sector identity information. At this timing, the subhead 111 is switched from tracking control to information erasing control. Then the information which has previously been written into the DATA field is erased through the demagnetizing effect of the subhead 111 in accordance with the erase signal supplied via the amplifier 226. Subsequently, information supplied through the amplifier 135 is written into the DATA field by means of the main head.

Figure 18A:
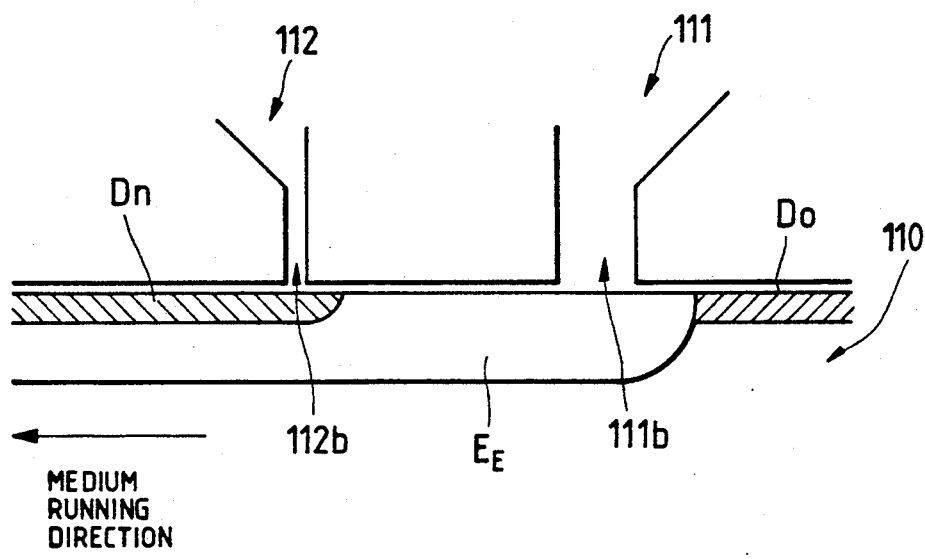
FIG. 18 is a diagram showing a magnetic disk during the reading and writing of information.

FIG. 18(a) shows the disk during a write operation. The subhead 111 has a wider gap 111b and runs ahead of the main head 112 to erase deeply into the track sequentially to ensure that the field $E_D$ containing the old data $D_0$ is completely erased. At the same time, the main head 112 with the narrow gap 112b writes the new information Dn sequentially into the field $E_E$.

Figure 18B:
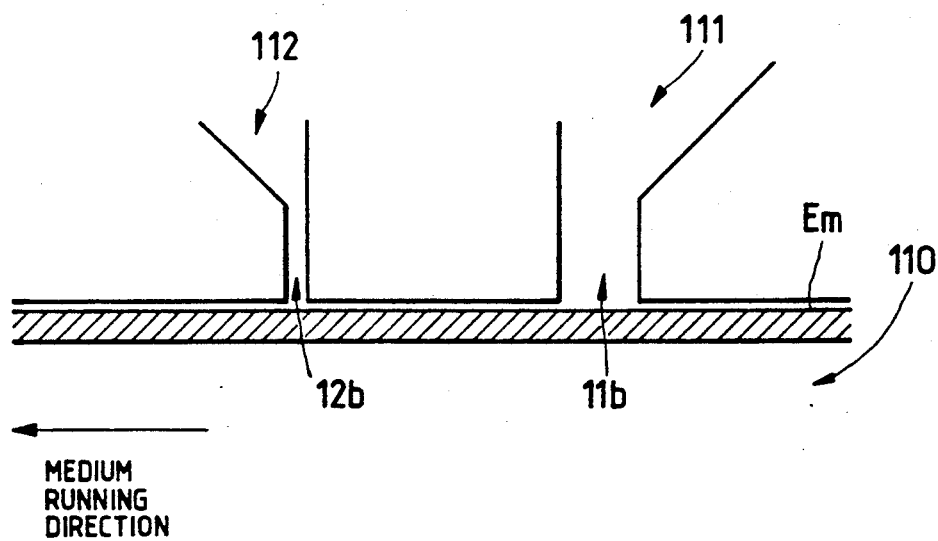
Figure 19:
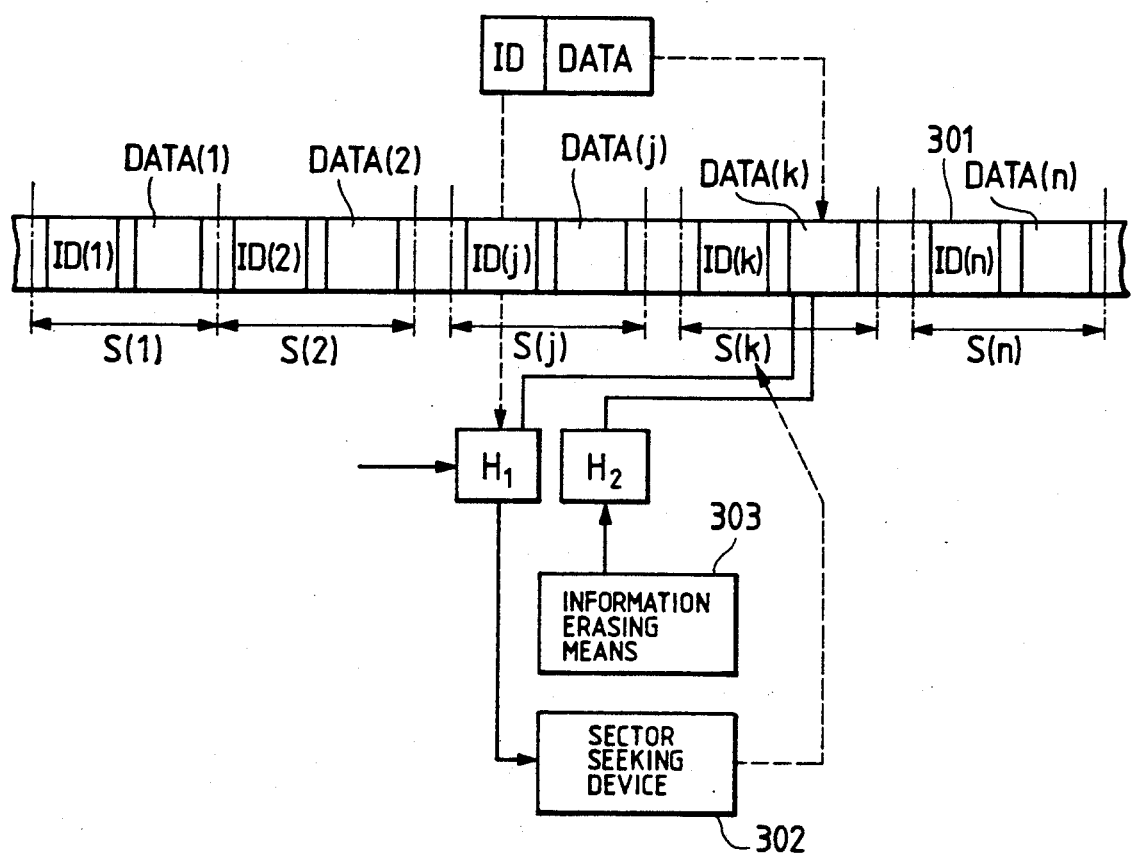
FIG. 19 is a diagram showing an arrangement of a fourth embodiment of the present invention.

FIG. 18(b) shows the magnetic disk when the data is read. The magnetized portion Em formed on the surface of the magnetic disk 110 through writing of the information is not affected by the reading operations performed by the subhead 111 and the main head 112.

As stated above, the apparatus according to the present invention is adapted to read the servo information written into the deep portion of the ID field by means of the subhead 111 having a wide gap, and to control the position of the main head 112 relative to the desired track on the basis of this servo information. Accurate tracking control is made possible without sacrificing the amount of information that may be stored on the disk.

Moreover, by writing the servo information into the deep portion of the field or the like where no other information is written, no variation in the thickness of the magnetized portion will occur due to the writing of the information through various heads having variations in the gap. Also when writing the information, the servo head erases the previous information prior to the actual write operation, and then the new information is written by the main head 112 into the field where the old information has been completely erased. Thus, the information can be written with good signal to noise ratio.

In addition, the wider gap of the subhead 111 is set, the more deeply will be the erasure into the disk and the better the writing condition of the subsequent information. Since the information in the surface portion of the disk cannot be read out if the gap is wide, the low pass filter 12 of the tracking system in FIG. 16 is not required when the gap of the subhead 111 is wider than a certain value.

In the aforementioned embodiment, although the identity information of the sector is read through the main head 112, the identity information can also be read out through the subhead 111 by properly setting the gap of the subhead 111. In other words, in the case where the identity information is written on the surface potion of the disk and the servo information is written in the deep portion of the disk, respectively, the identity information of high density can be sampled through the high pass filter from the signal obtained by means of the subhead 111 while the servo information of low density can also be sampled through the low pass filter from the same signal.

A fourth embodiment of the invention with now be described with reference to FIG. 19 to FIG. 23. The fourth embodiment of the invention relates particularly to a magnetic disk apparatus, where a storage track on the magnetic disk is divided into sectors $S(i)(i=1,2,...,n)$. Each sector S(i) includes an ID field ID(i) in which position information for specifying the location of the sector S(i) is stored and a data field DATA (h) into which data is to be written (h=1,2,...,n). A data field DATA (k) which makes a logic pair with an arbitrary ID field ID(k) is defined in a sector S(j) that is in a given positional relation with a sector S(k) on the magnetic disk 301 specified by the position information stored in the ID field ID(k). The magnetic disk apparatus includes a read/write head H1 for reading the data from and writing the data into the magnetic disk 301, an erase head H2 disposed ahead (upstream) of the read/write head H1 in the direction of the rotation of the disk and a sector seeking device 302 for seeking, during a write operation, a sector S(j) in which a data field DATA(k) corresponding to a position information stored in the ID field ID(k) in the sector S(k) is formed. With the sector seeking device 302, the sector S(j) is subject to a seek on the basis of the aforementioned given relation with the sector S(k) when the desired position information is read out (from the ID field ID(k)) through the read/write head H1. An information erasing means 303 erases the old data in the data field DATA(k) of the desired sector S(j) by means of the erase head H2 prior to writing information through the read/write head H1.

More specifically, when writing, the read/write head H1 first reads information from the disk sequentially to pick up the desired position information from the ID field ID(k), and the sector seeking device seeks a sector S(j) that is in the given relation with the sector S(k) specified by the position information. When the desired sector S(j) is found, the erase head H2 erases the old data in the data field DATA(k) of the present sector S(j) prior to information writing by the read/write head H1.

Figure 20A:
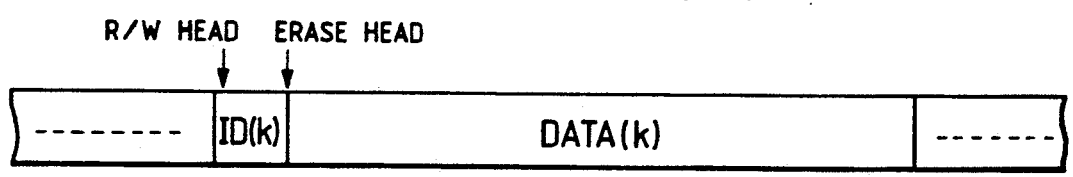
FIG. 20 is a diagram showing the positional relation on a track between a read/write head and an erase head when erasure of information is performed by the erase head prior to information-writing by the read/write head.
Figure 20B:
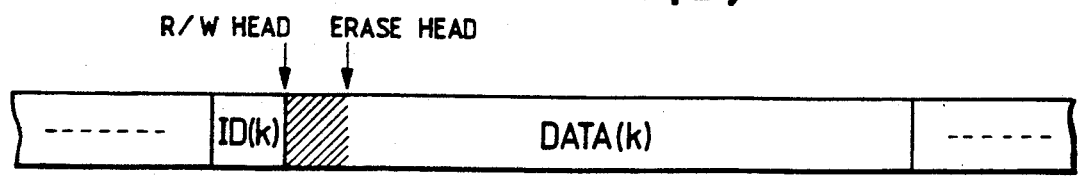

Generally, in the case where erasing information by means of the erase head is performed prior to writing information through the read/write head, since a data field DATA(k) that makes a logic pair with an arbitrary ID field ID(k) is usually defined within a sector S(k) that is specified by the position information stored in that ID field ID9K0, the erase head that runs ahead of the read/write head will have entered the data field DATA(k) as shown in FIG. 20(b) when the rear/write head completes the search for the ID field ID(k). Thus, if data erase operation is performed at this point of time, a portion of the data field will be left unerased as a waste area. In this respect, it is desirable to make the distance between the erase head and the read/write head as small as possible to minimize this waste area. However, machineability and cross talk problems between the heads place limitations on the reduction of the distance between the heads. The fourth embodiment permits writing new information after the old information has been erased without leaving the waste area in the data field of the respective sectors.

Figure 21:
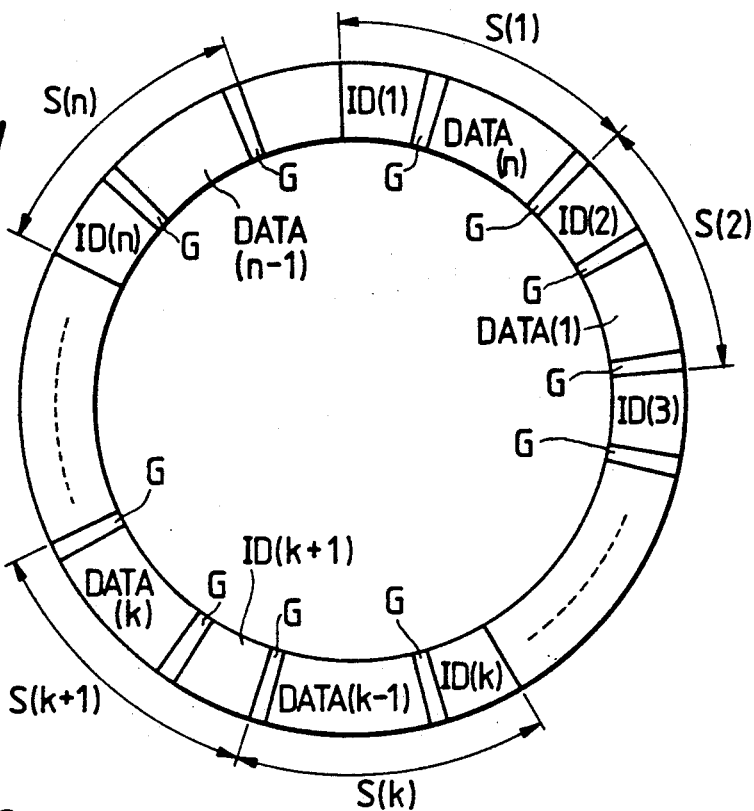
FIG. 21 is a diagram showing an example of a data format on a storage track of a magnetic disk used in a magnetic disk apparatus according to the fourth embodiment of the present invention.

FIG. 21 is a diagram for showing an example of the data format on the storage track of the magnetic disk according to the fourth embodiment of the present invention. It is assumed that a magnetic disk apparatus having interchangeable storage media, for example, a floppy disk apparatus, is used in the fourth embodiment.

A storage track is divided into the individual sectors, S(1), S(2), ..., S(n), each of which has an ID field into which is written the position information to specify the location of that sector and a DATA field into which the data needed is written. The ID field and the DATA field are separated by a gap G. Also, the data field is defined in a sector next to the one specified by the position information stored in the arbitrary ID field. More specifically, the data field DATA(1) that makes a pair with an ID field ID(1) is defined in a sector S(2) subsequent to the sector S(1) specified by the position information stored in that ID field ID(1), the data field DATA (2) which makes a pair with an ID field ID(2) is defined in a sector S(3), and so on. Then, data fields are defined subsequently in a similar manner, and the data field DATA(n) making a pair with the ID field ID(n) is formed in the sector S(1).

Further, the magnetic disk apparatus is of a type in which an interchangeable storage medium is assumed and the head follows the servo on the data surface. Thus, the magnetic disk apparatus employs a sector servo method in which servo information is written in every sector. Specifically, for the purpose of preventing a decrease of the storage density due to writing the servo information, a magnetic disk such as used in the first embodiment as shown in FIG. 4 and FIG. 5 is preferably used.

Meanwhile, the head assembly used in the magnetic disk apparatus is, for example, conveniently implemented by the heads of the second embodiment, as shown in FIG. 9 to FIG. 11, in which case the gap 111b of the subhead 111 is set to 2 um and the gap 112b of the read/write head 112 is set to 0.3 um.

Figure 22:
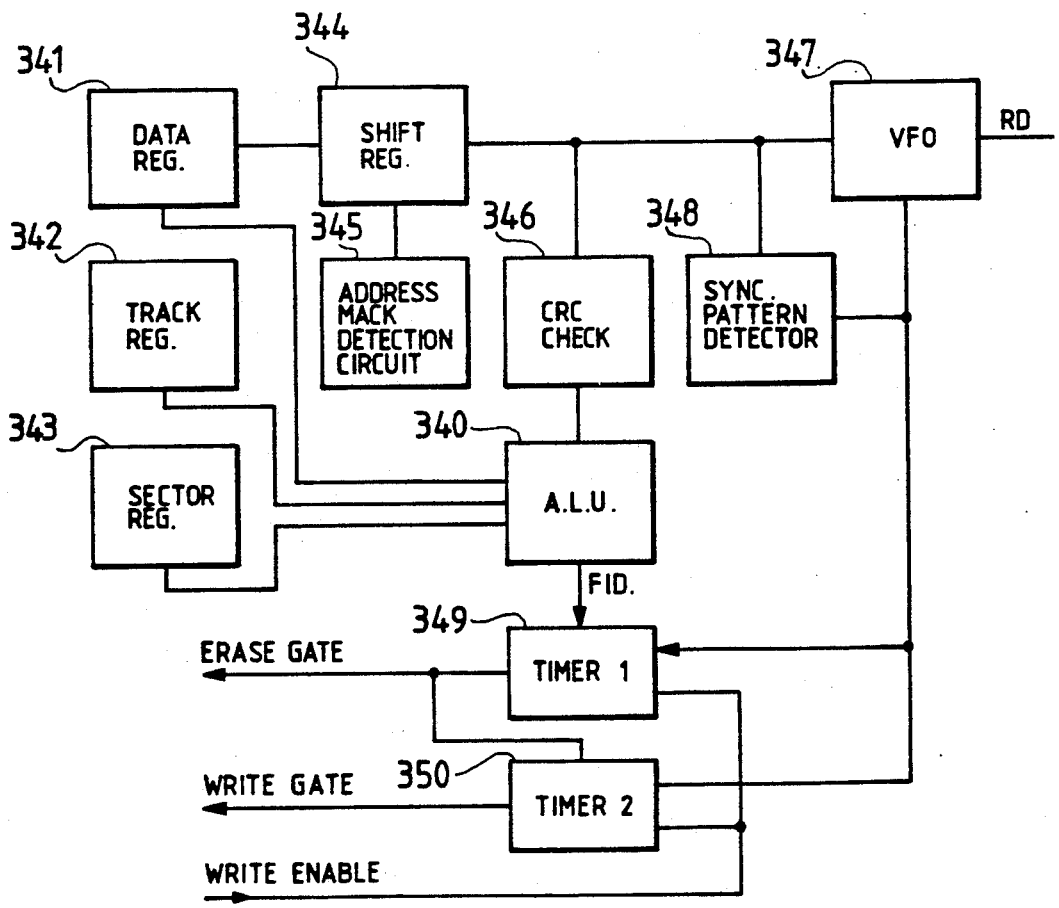
FIG. 22 is a block diagram showing a specific arrangement of a timing controller of data erasing and data writing.

The third embodiment shown in FIG. 15 can be used as a basic arrangement of a magnetic disk apparatus according to the present invention, except that the timing controller of the read-chain and the write-chain is specifically arranged, for example, as shown in FIG. 22.

In FIG. 22, an ALU 340 (Arithmetic Logical Unit) for overall timing control, is connected to a data register 341 for storing the data that is read out by means of the read/write head 112. A track register 342 stores a track number to specify the location of the track containing a sector into which data is to be written, and a sector register 343 stores a sector number to specify the location of a sector on the track.

An address mark detection circuit 345 detects the address mark AM of data that is stored in the register 344, and a CRC check circuit 346 performs cyclic redundancy checks of the data. A VFO 347 (Variable Frequency Oscillator) is connected to a synchronization pattern detector 348 and the VFO 347 is adapted to be locked upon the detection of the synchronization pattern.

A first timer 349 is activated to output a signal during a write enable condition after a predetermined time T1 every time the VFO 347 is locked. A second timer 350 that is activated to output a signal during the write enable condition after a predetermined time T2 and every time the VFO 347 is unlocked. An erase gate of the erase-chain is set ON when the first timer 349 outputs a signal, while a write gate becomes ON when the second timer 350 outputs a signal. The operation of the fourth embodiment will now be described as follows.

After the head assembly of the subhead 111 and the main head 112 have moved to the desired track upon completion of a seek command, the subhead 111 is connected to provide data to be used to perform position-control of the main head every time the subhead 111 reads the position control portion of the ID field into which the servo information $SD_A$, $SD_B$, or $SD_A'$, $SD_B'$ is written. Tracking control is then performed with respect to the desired track Tk. The signal through the subhead 111 is allowed to pass through the low pass filter 12 for sampling particularly the servo information $SD_A$, $SD_B$, or $SD_A'$, $SD_B'$ of low density, which will be fed to the head position error detection circuit 13. The head position error detection circuit 13 outputs a position error signal with respect to the desired track Tk on the basis of the servo information. The head drive circuit 15 controls the respective heads in a single unit construction to follow the desired track on the basis of a position modification control signal from the head position control circuit 24 corresponding to the position error signal.

Figure 23:
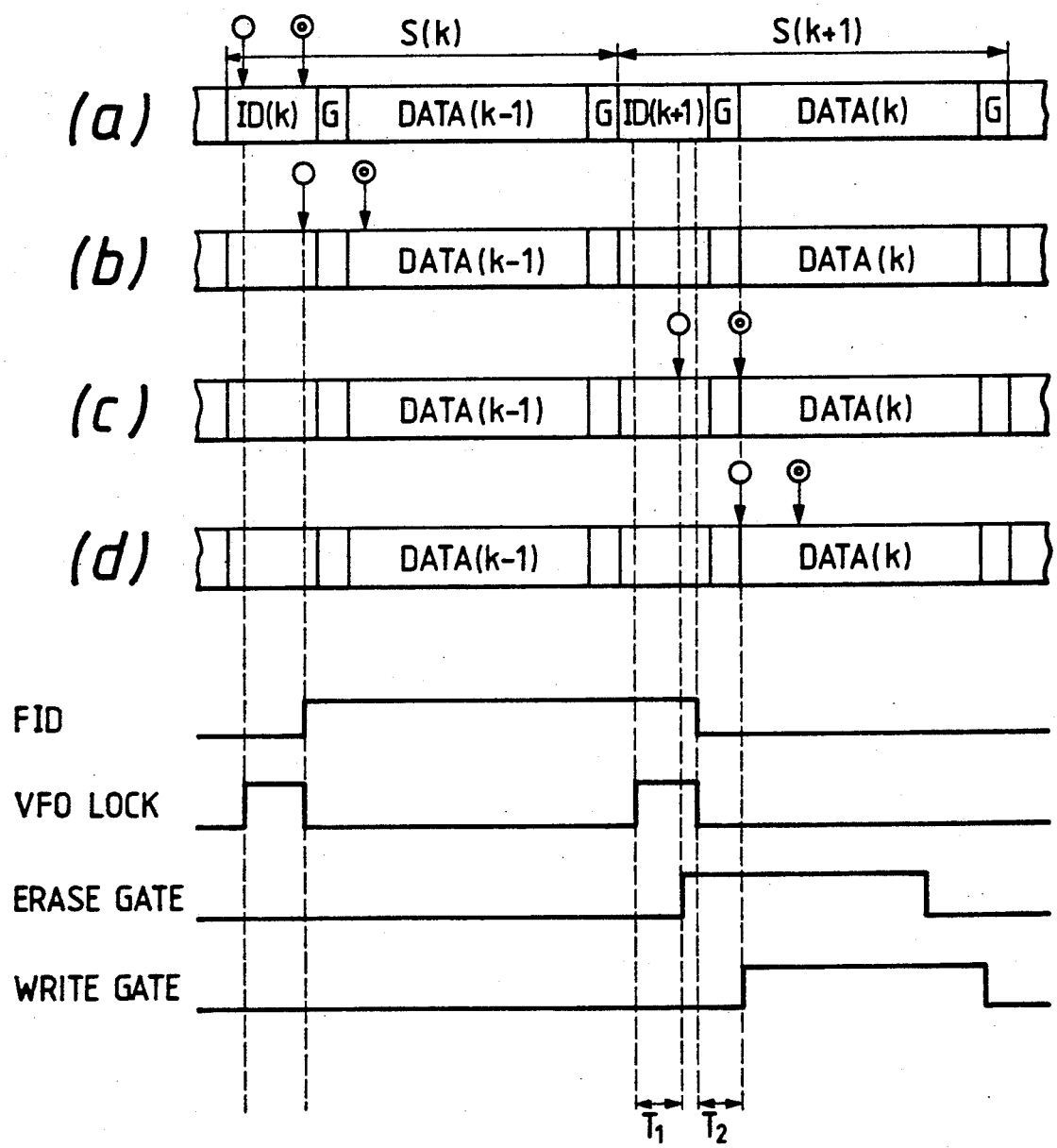
FIG. 23 is a timing chart showing the timing of the respective parts of the apparatus when writing the information.

The specific timing of the position control in the case of writing information is shown in FIG. 23. In FIG. 23, the position of the read/write head 112 relative to the track is shown by ◯ and the position of the subhead 111 as the erase head relative to the track is shown by ⊙. Upon a write command, the sync-signal is read out from a sync-area at the beginning of the ID field of each sector to lock the VFO for searching for an ID. During this process, for example, upon coincidence of the desired position information (specified together with the write command by a higher level apparatus) and the position information (track number, sector number) which is read out when the read/write head passes through the ID field ID(k) of the sector S(k), (FIG. 23(a) to (b)), the CRC check is performed and an FID (found ID) signal is outputted as having found the desired position information. The data field DATA(k) that makes a logic pair with the ID field ID(k) in which the position information is stored is set in the next adjacent sector S(k+1) when the FID signal is present. The first timer 349 is activated as having found the desired sector. Then, after the predetermined time T1 has elapsed, the erase gate becomes ON to initiate erasing the information in the data field by means of the subhead 111 as the erase head (c). The predetermined time T1 of the timer 349 is dependent on the location of the subhead 111 when the VFO has been locked and on the relative speed between the magnetic disk and the head, and is predetermined such that the subhead 111 is positioned at the beginning of the data field after elapse of the predetermined time T1. When the read/write head 112 reaches the end of the ID field ID(k) of the sector S(k) to unlock the VFO after erasure through the subhead 111 has been initiated, the second timer 350 is activated. The write gate switches ON after the time T2, which is set by the timer 350, to initiate the information writing by means of the read/write head 112 at the data field beginning with the sync field and an address mark (FIG. 23(d)). The predetermined time T2 of the timer 350 is dependent, in a manner similar to the first timer 349, on the relative speed between the magnetic disk and the head and the position of the read/write head 112 when the VFO is unlocked, and is determined such that the read/write head 112 is positioned at the beginning of the data field after the present time T2.

After the information-writing by the read/write head has been initiated, for example as shown in FIG. 18(a), the subhead having a wide head gap 111b runs ahead of the read/write head 112 for erasing sequentially old data Do on the track of the magnetic disk 110 deeply into the disk to provide the field $E_E$ where the old data has been erased thoroughly. Then the read/write head 112 with a narrow head gap 112b writes new data Dn into the field $E_E$.

When reading the information, if the information in the data field DATA(k), which makes a logic pair with the ID field ID(k), is to be read, then the read command is outputted to cause a read of sector S(k+1) (FIG. 18(b) shows the disk in this condition) when the position information stored in the ID field ID(k+1) is read out by means of the read/write head 112.

As described above, since the servo information written deeply into the ID field is read by means of the subhead 111 having a wide gap to control the position of the read/write head 112 relative to the desired track on the basis of the servo information, accurate tracking control is made possible without sacrificing the amount of the information to be stored in the magnetic disk. Writing the servo information deeply into the ID field where no information is written prevents, particularly, the variation of a magnetized thickness caused by the servo information in the deep portion of the disk due to information-writing with different heads having variations in gap, and permits readout with good precision.

When writing information, the subhead 111 serves to operate as an erase head to erase the information prior to the information-writing by the read/write head to erase the old information thoroughly before the new information is written by the read/write head 112. Therefore, the information can be written with good signal-to-noise ratio. Also the field that makes a logic pair with the ID field of each sector is defined in the sector next to a sector that is specified by the position information stored in that ID field. Thus, when the control system recognizes the desired sector, the read/write head 112 and the subhead 111 that serves to operate as an erase head will not have arrived at the corresponding data field.

Even if the subhead 111 and the read/write head 112 are positioned one preceding the other in the running direction, erasing the old information and writing the new information are both made possible from the very beginning of the data field. In the aforementioned embodiment, although the subhead 111 serves to operate as a erase head and is also used for tracking control of the heads, the present invention is not necesarily limited to the magnetic disk apparatus of a type which performs tracking control, but can be used as an erase head only.

The sector that define the data field that makes a logic pair with the ID field may not only be defined next to the sector specified by the position information stored in the ID field but also two sectors ahead or further next to these two sectors and so on, in such a way that the data DATA(k) which makes a logic pair with the field ID(k) defined in the kth sector S(k) can be defined in the jth sector S(j) where $j=(k+i)\mod(n)\ldots i<n$, where i: difference in terms of the number of sectors between ID field and data field n: the number of sectors formed on the track.

Further, the ID field ID(k) and the data field DATA(k) may also be defined with random relation as far as the relation therebetween is recognized. The data field which makes a pair with the ID field should preferably be defined in the next sector as in the aforementioned embodiment to minimize the time required to arrive at the desired sector into which the data is written and from which the data is read after the position information of the desired information has been recognized.

As stated above, according to the embodiment the data field that makes a logic pair with the ID field of each sector is defined by the sector in a predetermined relation with the sector that is specified by the position information stored in that ID field thereby effecting data erasure through the erase head prior to information-writing in the data field by means of the read/write head. Thus, the embodiment permits writing the new information with the old information necessarily having been erased from the very beginning thereof and without leaving the waste in the data field of the respective sectors where data erase is impossible. As a result, a stable data-write condition may be assured without impairing format efficiency of the magnetic disk as a storage medium.

What is claimed is:

1. A magnetic storage system comprising
   a magnetic head assembly;
   a magnetic storage disk having a plurality of concentric tracks, each of said tracks including a plurality of sectors, each sector including a general data field for storing general data, a sector identification data (ID) field for storing sector identification data and a servo-information field for storing servo information, said general data field and said ID field being provided in a shallow portion of said disk, said servo-information field being provided in a deep portion of said disk, said ID field overlying at least in part said servo-information field, said general data field being longitudinally separated from said servo-information field;
   general data reading/writing means for reading/writing general data in the general data fields through said magnetic head assembly;
   servo-information writing means for writing servo information for tracking control in the servo-information fields of the disk through said magnetic head assembly, said servo information being written in the servo-information fields longitudinally separated from said general data fields;

servo-information reading means for reading the written servo information through said magnetic head assembly;

means for reading through said magnetic head assembly the sector identification data in the ID fields; and tracking control means for controlling the position of the magnetic head assembly relative to a desired one of the tracks on the disk using the servo information read by said servo information reading means through said magnetic head assembly.

2. The type magnetic storage system according to claim 1, wherein said magnetic head assembly includes a main head and a subhead, said subhead being positioned in said assembly at a position upstream of said main head with respect to the direction of rotation of the disk.

3. The magnetic storage system according to claim 2, wherein said main head and subhead include means for joining them.

4. The magnetic storage system according to claim 2, wherein said main head is coupled to said general data reading/writing means and said subhead is coupled to one of said servo-information writing means and said servo-information reading means.

5. The magnetic storage system according to claim 2, wherein said main head has a writing gap and said subhead has a writing gap larger than the writing gap of said main head.

6. The magnetic storage system according to claim 2, further comprising;

information erasing means for selectively erasing said written general data through said subhead in advance of said main head.

7. The magnetic storage system according to claim 6, further comprising;

switch means for selectively connecting said subhead to said tracking control means and said information erasing means.

* * * * *